United States Patent
Huang et al.

(10) Patent No.: US 7,792,282 B1
(45) Date of Patent: Sep. 7, 2010

(54) RINGING FOR POWER SYSTEM MANAGEMENT

(75) Inventors: Tingwei Huang, San Jose, CA (US); George M. Hey, San Jose, CA (US); Jiabin Zhao, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1115 days.

(21) Appl. No.: 11/147,482

(22) Filed: Jun. 7, 2005

(51) Int. Cl.
*H04M 3/00* (2006.01)
(52) U.S. Cl. .................................................. 379/418
(58) Field of Classification Search .......... 379/338–418
See application file for complete search history.

(56) References Cited

U.S. PATENT DOCUMENTS

| 6,714,644 B1 * | 3/2004 | Cohn et al. ................. 379/372 |
| 6,956,943 B1 * | 10/2005 | Goodrich, II et al. .. 379/399.01 |
| 7,042,996 B1 * | 5/2006 | Mitra .................... 379/207.16 |

* cited by examiner

*Primary Examiner*—Alexander Jamal
(74) *Attorney, Agent, or Firm*—Marger Johnson & McClollom, P.C.

(57) ABSTRACT

A network device has at least two communication ports to allow the device to communicate with at least two telephony devices. The device has a ring manager to determine if any of the communication ports are silent ports ready to transition from silent to ringing, determine if there is power available to transition the silent ports to ringing ports, transition silent ports to ringing ports until an amount of available power is depleted, and queue remaining silent ports until power becomes available, such that silent ports in the queue may experience cadence distortion.

10 Claims, 3 Drawing Sheets

RINGING FOR POWER SYSTEM MANAGEMENT

BACKGROUND

Power management in telephony systems remains an important design consideration when power from a common source is shared among multiple subsystems. Minimizing the total peak power significantly reduces system cost and space. Subsystems providing analog telephone FXS (foreign exchange station), BRI (basic rate interface), and DID (direct inward dial) interfaces consume power when applying ringing voltage to telephones and loop power to off-hook telephones, DID trunks and BRI terminal equipment. Ringing telephones generally consumes more power than providing loop power. Intelligent management of ringing in multiport FXS applications reduces cost and space by reducing peak system power consumption.

Certain ports can consume more power than others according to their usage state. FXS ports may consume more power while ringing and, to a lesser degree, when off-hook. BRI ports functioning as NT (network termination) equipment may consume power while supplying loop power to far end TE (terminal equipment) devices. DID ports also consume power while off-hook.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

In some instances network devices, or modules of the network devices all which will be referred to here as network devices, that provide ring management services to multiple ports are only provided a limited amount of power. Ringing management, as used here, includes both alerting ports to incoming calls and providing loop power to off-hook telephones. The power required to ring a telephone is generally greater than that required to supply loop current to an off-hook telephone. Intelligent management of ringing reduces peak system power consumption and reduces costs in the system.

Figure 1:
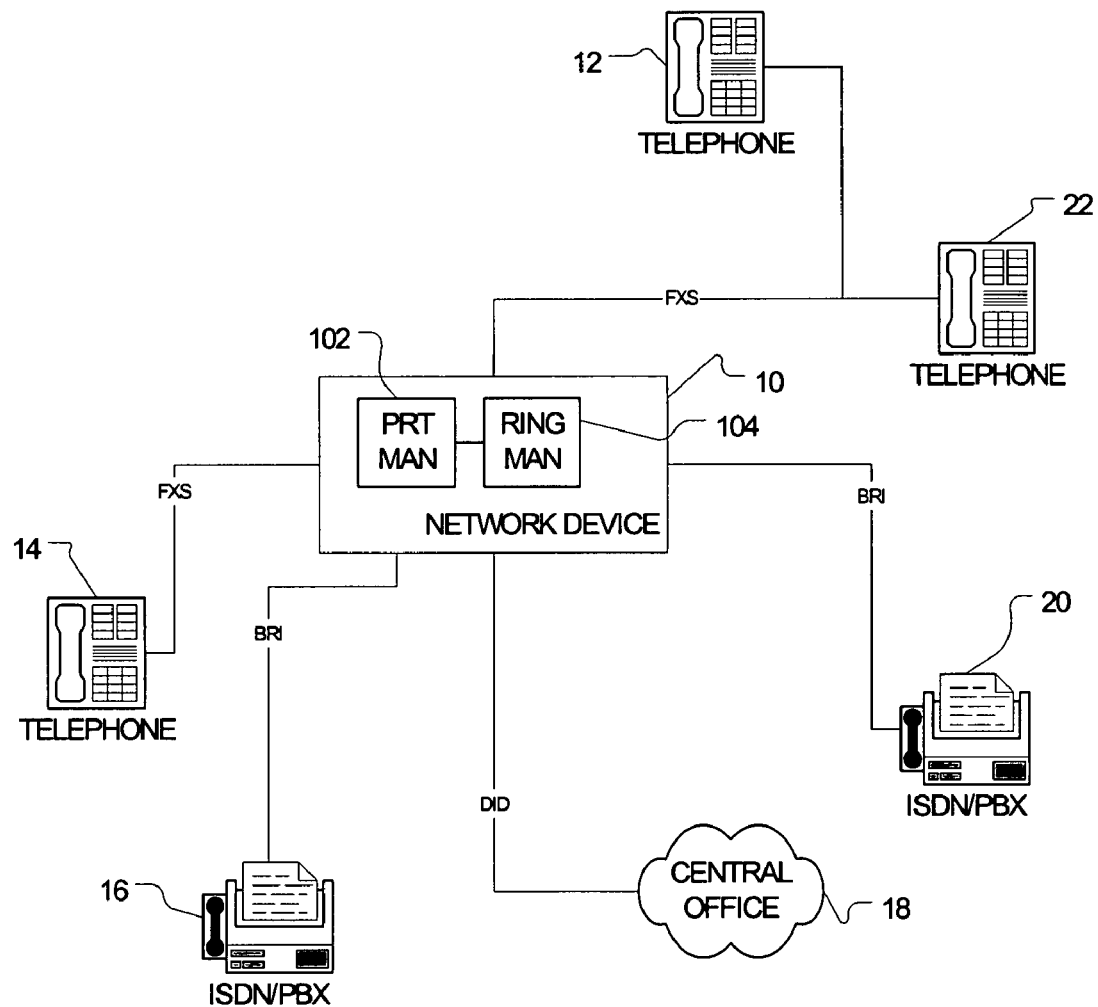
FIG. 1 shows an embodiment of a network device to provide ringing management to terminal equipment.

In one embodiment, the network device 10 of FIG. 1 may provide particular quantities and combinations of different port types, according to selected expansion modules and options. Certain port types consume more power than others, according to their usage state. FXS ports such as those supporting devices 12, 14 and 22, may have heavier power requirements than other devices while ringing and to a lesser degree when off-hook. BRI ports such as those supporting devices 16 and 20 may consume power while providing loop power to far end terminal equipment. DID ports such as that supporting device 18 consume power while off-hook.

With intelligent management and control of applied ringing to multiple FXS ports during simultaneous incoming calls, the limited power can provide ringing to more voice ports with minimum initial cadence delay. As used here, initial cadence delay is the delay in 'starting' the first ringing 'cadence on' period. Cadence on is when the port is ringing, and cadence off is when the port is silent.

For example, assume a port receiving an incoming call during a time of high available power immediately begins its cadence on followed by its cadence off period. During times of low available power, the first cadence on period on that port may be delayed until more power is available. But when the cadence does begin, the following cadence off and on periods remain unaffected. As a result, the entire cadence is shifted by the initial delay. This timing offset causes the ringing cadence on periods of certain voice ports to overlap with the ringing cadence off periods of others. Hence more ports can be rung at the same time without any increase of peak power consumption.

Unlike cadence delay, cadence distortion occurs when there is not enough power available for a voice port to switch back to the cadence on state, following an earlier cadence off period. It may have to remain in cadence off until more power is available. As a result, the cadence off period in that port is extended beyond its expected value and its ring cadences get distorted.

For example, assume a system has 2 FXS ports, and each voice port is to support a ring cadence of 2 seconds on and 1 second off. The system has only enough power to ring one port at any time. When port 1 receives an incoming call, it will start its ring cadence with 2 seconds of a cadence on period. During those two seconds, port 2 also receives an incoming call. As soon as the ringing in port 1 ceases after 2 seconds, the 'released' power is consumed by port 2. There is not enough power for port 1 to switch back to the cadence on state until 2 seconds later when port 2 enters a cadence off period and releases the power back to the system. The difference between the desired sequence of 2 on/1 off, and the resulting sequence of 2 on/2 off, is ringing or cadence distortion. In some instances, some ports may experience cadence delay, cadence distortion or both.

In one embodiment, the ringing management is implemented in network device 10 as a port manager 102 and a ring manager 104. The port manager monitors the signaling events on the ports and moves the ports in or out of the ring queue on certain signaling events. The ring manager services the ports in the ring queue periodically, turning on or off the ports according to their cadence. In this discussion, turning a port on may also be referred to as switching the port to cadence on state, while other types of alerting may be used. Turning a port off may be referred to as switching a port to cadence off state. In either case, the movement of a port from on to off or off to on may be referred to as transitioning the port.

Figure 2:
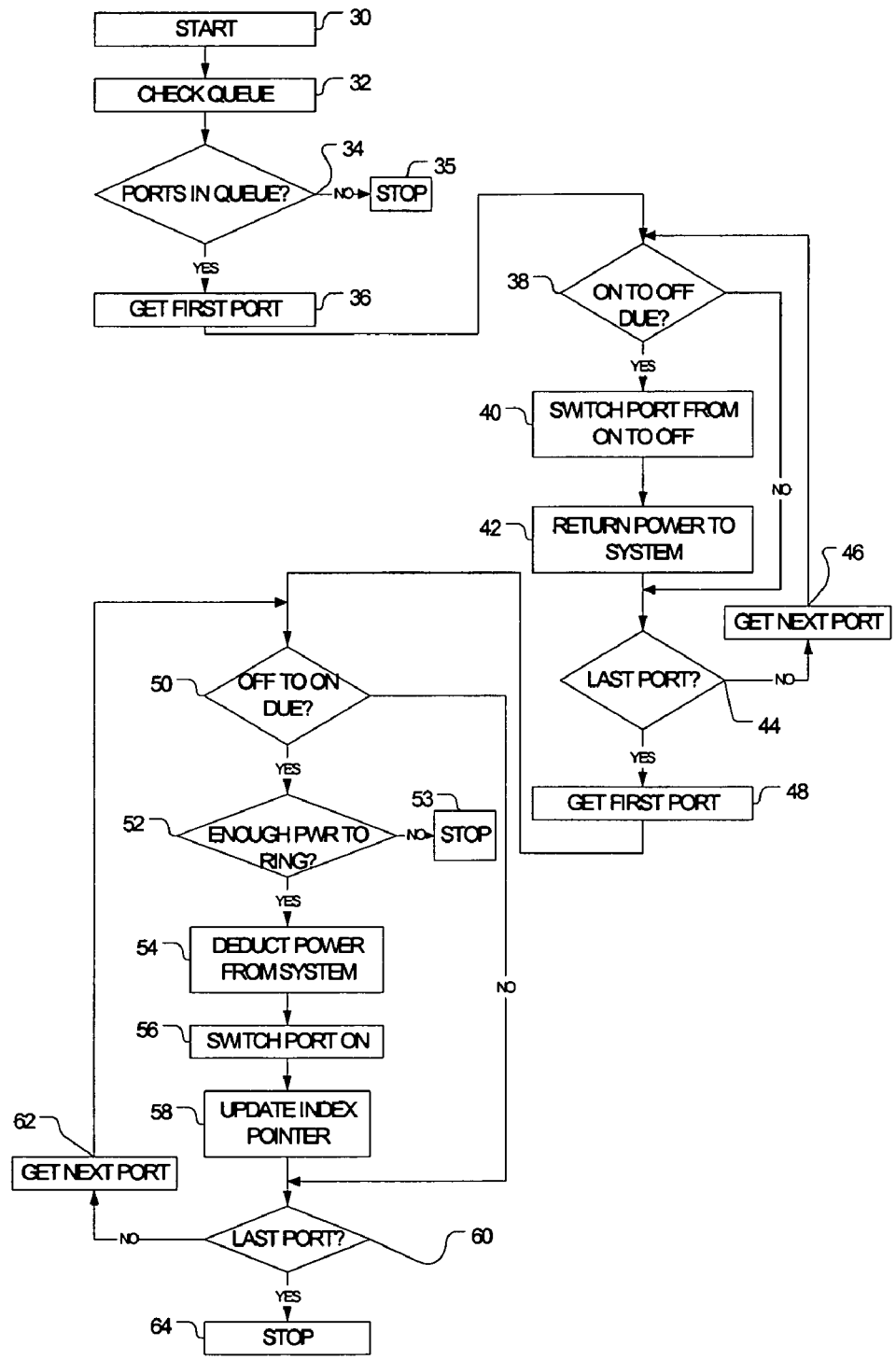
FIG. 2 shows a flowchart of an embodiment of a method to provide ringing management to terminal equipment.

A flowchart of an embodiment of a method to manage ringing in a network device is shown in FIG. 2. In one embodiment, when a voice port is set to ring, the port manager will intercept the command and push the port into the ring queue. A timer is attached to the port to keep track of its ring cadence timing and activates the ring manager as needed. It must be noted that the port manager may be optional, as its functions could be incorporated into a ring manager module.

In one embodiment, the ring manager 'wakes up' or becomes active periodically. In other embodiments, the ring manager remains vigilant until at least one port is moved into the ring queue. The process starts at 30. The ring manager checks the ring queue at 32. If there is no port in the queue at 34, it stops at 35.

The ring manager gets the first port from the queue at 36. If the ring manager determines at 38 that there are any ports requiring ringing to silent transition, it will switch those ports from cadence on to the cadence off state at 40. It then returns the power tokens taken by those ports back to the system at 42. At 44, the ring manager determines if the just-processed port is the last port in the queue. If it is not, it gets the next port at 46 and the process returns to 38. If it is the last port in the queue at 44, that means all the ringing to silent transition requests have been processed. The ringing manager then proceeds to handle the silent to ringing transition at 48.

At 50, the ring manger determines if there are any ports due for a cadence off to a cadence on transition, a transition from silent to ringing. Based upon the amount of current available power, the process will determine if a voice port can be switched from cadence off to cadence on state at 52. If there is not enough power, the process stops at 53. Otherwise, it will deduct the amount of power consumed by the voice port from the system at 54 and turn on the ringing on the port at 56. It will also update the queue index pointer to move the port to the end of ring queue at 58. The process continues until all the silent to ringing transition requests have been satisfied or all the available power has been used up.

The power is generally measured or tracked by REN, ringer equivalence number. For example, if the device has 15 REN available, and it needs to ring 25-REN devices, the amount of available power is reduced by 10 REN, the amount it takes to ring the two devices. This leaves 5 REN in the 'bucket' for another device to use if it receives a ring signal. If the power is used up before all the requesting ports can be rung, the ringing on the reset of the voice ports will be put on hold. They may have to wait until one or more voice ports enter cadence off period and release the power they seize.

Cadences may vary from country to country, which has an impact on implementation of ringing management. For example, many cadences require cadence ratios, R, to be ⅓ or less. R is the on period divided by the on period plus the off period. For example, the common North American ringing cadence of 2 seconds on followed by 4 seconds off has R=2/(2+4)=⅓.

When all of the ports in the ring queue have ratios less than or equal to ⅓, the maximum number of ports that can be rung with no cadence distortion is 1/R*L, where L is the on limit. Consider the example of 3L calls coming in simultaneously and all ports are configured for R=⅓. The first L calls in the queue can be rung immediately. More ringing power is freed for additional incoming calls as calls from the first group enter their off periods. The next L calls will commence ringing in turn, and then the final L calls will commence ringing. As the ringing power frees up, unanswered ports from the first group of L calls will start their next on period, etc. In this example, the ports experience a cadence delay for the second and third groups, yet none experience cadence distortion.

The probability P of N simultaneous incoming calls for the ring queue decreases as N increases. As the number of ports N in the ring queue increases, the on limit L is allowed to increase gradually. A higher count of number of ports simultaneously transitioned to on occurs with a lower probability. This minimizes power consumption while avoiding cadence distortion. Using a binomial distribution probability function, it is possible to provide an example demonstrating this.

In this example, there are 24 FXS ports. The example is a high-volume call center. The average call duration is 3 minutes and the number of calls per hour per port is 20. The cadence is 2 seconds on, 4 seconds off, so R=⅓. The number of cadence on periods per call (number of rings) is 3. The variable N is defined as the number of simultaneous incoming calls. P is the probability of occurrence. L is the cadence on limit, as discussed above, D is the cadence distortion and I is the number of ports with potential cadence delay.

| N | P | L | D | I |
|---|---|---|---|---|
| 0 | 0.34 | N/A | N/A | N/A |
| 1 | 0.38 | 1 | NO | 0 |
| 2 | 0.20 | 2 | NO | 0 |
| 3 | 0.068 | 3 | NO | 0 |
| 4 | 0.017 | 3 | NO | 1 |
| 5 | 0.0031 | 3 | NO | 2 |
| 6 | 0.00046 | 3 | NO | 3 |
| 7 | 0.000055 | 3 | NO | 4 |
| 8 | 0.0000054 | 3 | NO | 5 |
| 9 | 0.00000045 | 3 | NO | 6 |
| 10 | 0.000000031 | 4 | NO | 6 |
| 11 | 0.0000000019 | 4 | NO | 7 |
| 12 | 0.000000000094 | 4 | NO | 8 |
| 13-15 | 10E-12 | 5 | NO | 8-10 |
| 16-18 | 10E-16 | 6 | NO | 10-12 |
| 19-21 | 10E-22 | 7 | NO | 12-14 |
| 22-24 | 10E-28 | 8 | NO | 14-16 |

It must be noted that, for the above example, N rarely exceeds 12 and the cadence on limit rarely exceeds 4. If per port ringing cadence on power consumption equals 4 Watts, then only rarely would the ringing power exceed 4 Watts*4 ports=16 Watts.

If the cadence ratio R were equal to Y2, cadence distortion would first begin to appear when the number of simultaneous incoming calls, N, exceeds 6. However, the ringing power would be the same as for the case where R=⅓. It is possible to adjust the ringing power management method to support individual ports having user defined ringing cadences, even complex cadences like 0.5 second on, 0.5 second off, followed by 1 second on and 1 second off. In such cases, cadence distortion may occasionally occur.

Figure 3:
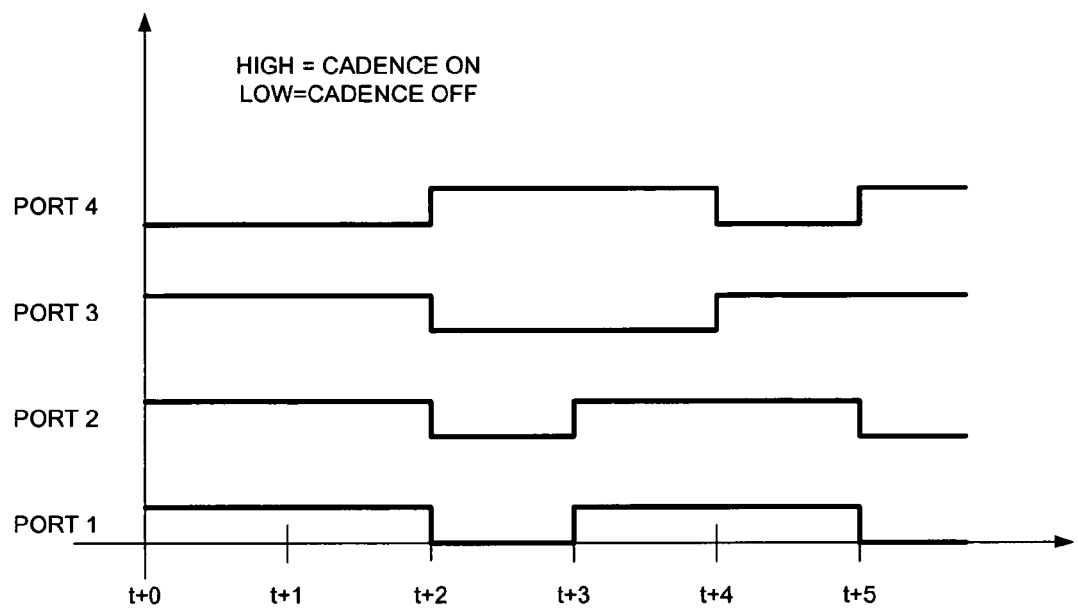
FIG. 3 shows a timing diagram of a 4-port embodiment of ringing management.

The embodiments of the invention may be best understood by illustration of a very specific example. It must be understood that this is only to ease understanding of the invention, and is in no way intended to limit application of the invention or the scope of the claims. Referring now to FIG. 3, assume a system with 4 FXS ports, in which each port is configured to support a ring cadence of 2 seconds on, 1 second off. R is equal to ⅔. The power loading of each port is 5 REN and the maximum ringing power the system can provide is 15 REN. Only 3 ports can ring at one time.

If all 4 ports were called simultaneously and all needed to be rung at the same time, all 4 ports would be pushed into the ring queue immediately. Only ports 1, 2 and 3 can ring, and port 4 has to wait at time=0 in FIG. 3. The 15 REN available are all consumed by ports 1, 2 and 3.

At time t=2, ports 1, 2 and 3 fall silent and will be silent for 1 second. Fifteen REN become available and port 4 takes 5 REN to ring and will ring for 2 seconds. However, at t=3, ports 1, 2 and 3 need to ring, but there are only 10 REN available, since port 4 is still ringing. Ports 1 and 2 ring and consume the 10 REN. Port 3 must wait another second to get the 5 REN freed when port 4 goes silent before it can ring. As a result, the ring cadence of port 4 is initially delayed, and the ring cadence for port 3 is distorted during its second cadence period. Its resultant distorted cadence is 2 seconds on, 2 seconds off, which is different than the desired pattern of 2 seconds on, second off.

Cadence distortion will spread among all 4 ports in turn, instead of being applied to only one particular part if alerting continues without answer on all four ports. Of course, if one or more of the lines are answered before they would ring again, the REN are freed and there is enough power to ring the remaining ports without distortion until they are answered or disconnected.

Figure 4:
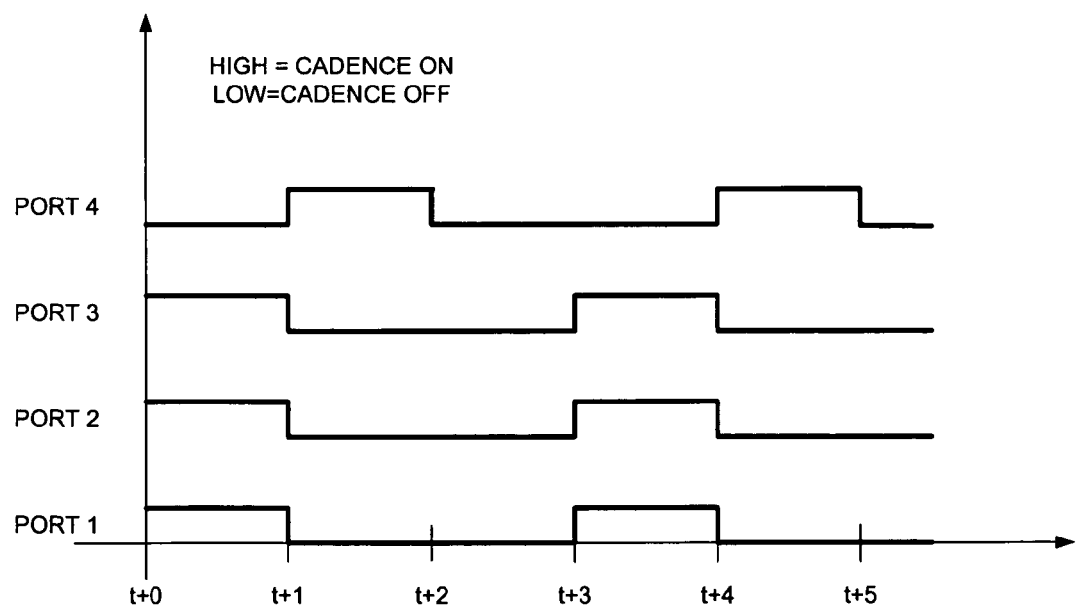
FIG. 4 shows a timing diagram of an alternative 4-port embodiment of ringing management.

In another example, shown in FIG. 4, it is possible to use a smaller ring cadence ratio in the above case to achieve a ringing scheme that has ring cadence delay, but no cadence distortion. For example, using a sequence of 1 second on and 2 seconds off and the same problem of four incoming calls simultaneously, the ringing of port 4 will be delayed one second to t=1, but at the end of that second the other three phones fall silent for two seconds. At t=2, all four phones are silent. At t=3, the first three phones complete their silent period and ring for one second. At the first three phones fall silent, and port 4 rings for one second. Port 4 experienced cadence delay, and none of the phones experienced cadence distortion.

In addition to the considerations of ring cadence ratios and other parameters, demonstrated above, there are also considerations of immediate ringing and fixed phases among the ports. Immediate ringing is achieved by default as long as the maximum REN power is not exceeded. The ports do not have the same fixed phase as the other ports. Each port has its own phase. This in one aspect that allows the customized ringing on each port, as mentioned above.

Thus, although there has been described to this point a particular embodiment for a method and apparatus for ringing power management, it is not intended that such specific references be considered as limitations upon the scope of this invention except in-so-far as set forth in the following claims.

What is claimed is:

1. A network device, comprising:
   at least two communication ports to allow the device to communicate with at least two telephony devices; and
   a ring manager to:
      maintain a queue for communication ports of the at least two communication ports associated with silent to ringing requests and ringing to silent requests;
      determine if any of the communication ports in the queue are associated with current silent to ringing requests;
      for a communication port in the queue associated with a current silent to ringing request:
         determine if a value indicating an amount of available power indicates that there is power available to transition the communication port from silent to ringing;
         if power is available, transition the communication port from silent to ringing and reduce the value indicating the amount of available power; and
         if power is not available, leave the communication port in the queue, such that communication port may experience cadence distortion; and
      for a communication port in the queue associated with a current ringing to silent request:
         transition the communication port from ringing to silent;
         increase the value indicating the amount of available power; and
         return the communication port to an end of the queue.

2. The network device of claim 1, the network device further comprising a port manager.

3. The network device of claim 2, the port manager to:
   monitor the communication ports for signals; and
   if a signal event is detected on a communication port, move the communication port into the queue and attach a timer to the communication port.

4. The network device of claim 1, the ring manager and the port manager residing in a processor on the device.

5. A method of managing ring power, comprising:
   maintaining a queue for communication ports associated with silent to ringing requests and ringing to silent requests;
   determining if any communication ports in the queue are associated with current silent to ringing requests;
   for a communication port in the queue associated with a current silent to ringing request:
      determining if a value indicating an amount of power indicates that there is power available to transition the communication port from silent to ringing;
      if power is available, transitioning the communication port from silent to ringing and reducing the value indicating the amount of available power; and
      if power is not available, leaving the communication port in the queue, such that the communication port may experience cadence distortion; and
   for a communication port in the queue associated with a current ringing to silent request:
      transitioning the communication port to silent;
      increasing the value indicating the amount of available power; and
      returning the communication port to an end of the queue.

6. The method of claim 5, the method further comprising receiving an activation signal from a port manager.

7. The method of claim 5, wherein processing communication ports in the queue associated with a current ringing to silent requests occurs prior to processing communication ports in the queue associated with current silent to ringing requests.

8. A network device, comprising:
   means for allowing the device to communicate with at least two telephony devices through at least two communication ports; and
   means for:
      maintaining a queue for communication ports associated with silent to ringing requests and ringing to silent requests;
      determining if any of the communication ports in the queue are associated with current silent to ringing requests;
      for a communication port in the queue associated with a current silent to ringing request:
         determining if a value indicating an amount of power indicates that there is power available to transition the communication port from silent to ringing;
         if power is available, transitioning communication port from silent to ringing and reducing the value indicating the amount of available power; and
         if power is not available, leaving the communication port in the queue, such that the communication port may experience cadence distortion; and
      for a communication port in the queue associated with a current ringing to silent request:
         transitioning the communication port to silent;
         increasing the value indicating the amount of available power; and
         returning the communication port to an end of the queue.

9. The network device of claim 8, the network device further comprising means for managing ports.

10. The network device of claim 9, the means for managing ports further to:
    monitor the communication ports for signals; and
    if a signal event is detected on a communication port, move the communication port into the queue and attach a timer to the communication port.

* * * * *